US006158493A

United States Patent [19]

Hildebrand et al.

[11] Patent Number: 6,158,493

[45] Date of Patent: Dec. 12, 2000

[54] TAPE AND TAPE LINER REMOVAL TOOL

[76] Inventors: Paul E. Hildebrand, 38215 Fremont Blvd., #4, Fremont, Calif. 94536; Nicholas Campagna, 527 Spruce Ave., So. San Francisco, Calif. 94080

[21] Appl. No.: 09/130,719

[22] Filed: Aug. 6, 1998

[51] Int. Cl.[7] .............................. B32B 35/00; A47L 13/08

[52] U.S. Cl. ........................ 156/584; 156/344; 15/236.01; 15/236.07; 30/169

[58] Field of Search ..................................... 156/344, 584; 15/236.01, 236.07; 30/169; D32/46, 49

[56] References Cited

U.S. PATENT DOCUMENTS

| | | | |
|---|---|---|---|
| D. 23,068 | 2/1894 | Leggett | D32/46 |
| D. 52,990 | 2/1919 | Graham | 30/169 X |
| 1,261,844 | 4/1918 | Orr | 15/236.01 X |
| 3,040,802 | 6/1962 | Frazer . | |
| 3,818,592 | 6/1974 | Himeno . | |
| 4,248,660 | 2/1981 | Johnson . | |
| 4,642,894 | 2/1987 | Campbell | 30/169 |
| 5,022,951 | 6/1991 | Behlmer et al. . | |
| 5,586,357 | 12/1996 | Kosakowski et al. | 15/236.01 X |

*Primary Examiner*—Mark A. Osele
*Attorney, Agent, or Firm*—John J. Leavitt

[57] ABSTRACT

Presented is a multipurpose tool formed from an elongated unitary length of material narrow in comparison to its length and having a main body portion on one end of which is integrally formed a reentrant portion that functions as a clip to retain the tool clipped within a pocket, and which also provides a lip portion diverging from the main body portion and against which the thumb may rest during use. The end of the main body portion remote from the reentrant portion is provided with one or more sharpened edges, and in one embodiment two opposed recesses are formed in the lateral edges of the main body portion adjacent its sharpened end edge. A portion of the lateral edges that define the recesses are also sharpened as a continuation of the sharpened end edge.

7 Claims, 2 Drawing Sheets

TAPE AND TAPE LINER REMOVAL TOOL

BACKGROUND OF THE INVENTION

1. Field of the Invention

This invention relates to tools for removing tape from surfaces to which it is adhered and for removing from two-sided adhesive tape adhered to a surface, the thin paper protective layer normally found on two-sided adhesive, and more particularly to removing from two-sided adhesive tape of the type used in the newpaper industry the thin protective paper "liner" layer adhered to one side of the tape.

2. Description of the Prior Art

A preliminary patent ability and novelty search on this invention has revealed the existence of the following United States patents:

| | | |
|---|---|---|
| 3,040,802 | 3,818,592<br>5,022,951 | 4,248,660 |

With the advent of adhesive tape of the two-sided variety in which a protective "liner" is lightly and removably adhered to one side of the two-sided adhesive tape so that the tape strip may be rolled upon itself during shipping and storage and then enable unwinding of a selected length of the tape for use and the need to remove the "liner" layer to expose the second adhesive surface of the tape, there has been a great need for a tool that is inexpensive to fabricate, convenient to use, protects the fingers of the operator using the tool, and which may be conveniently carried in a shirt pocket for ready accessibility.

Accordingly, it is one of the important objects of the invention to provide a hand-manipulable tool that meets all of these criteria.

Another of the important objects of the invention is the provision of a tape or "liner" removing tool that is unitary in its construction.

A still further object of the invention is the provision of a tape or "liner" removal tool that may be carried safely and securely in a shirt pocket for ready accessibility when needed.

Still another object of the invention is the provision of a tape or tape "liner" removal tool that is configured to provide protection to the thumb when in use.

Yet another object of the invention is the provision of a tape or tape "liner" tool that is configured for use for other purposes in the newpaper industry besides removal of tape or tape "liner", for instance, to tear the "liner" at a predetermined pre-drive position, to take wraps off cylinders and pipe rollers after a paper web breaks, to remove "spaghetti" at nipping rollers, and to scrape off build-up of dry ink on plates, cylinders and pipe rollers, and many other uses.

Yet another object of the invention is the provision of a hand-held tool that may be used as a paint scraper and caulking remover in tight places, and for removing gaskets and insulation material not accessible with other types of tools.

The invention possesses other advantages and features of value, some of which, with the foregoing will be apparent from the description and drawings. It is to be understood however, that the invention is not limited to the embodiments described and illustrated since it may be embodied in various forms within the scope of the appended claims.

As indicated by the prior art patents listed above, other more complicated tools and therefore more expensive tools have been patented to perform specialized functions. For instance, the tool described and illustrated in U.S. Pat. No. 3,040,802 was designed specifically to remove from a backing sheet the letters, numbers or other indicia adhered thereto so that such indicia may be transferred to a different backing to provide a specifically designed sign or poster. While this device is called a "hand" tool in the title, it is noted that this device is intended to be attached to the surface of a supporting structure through insertion of a screw through the aperture 6 in the base plate 5.

Referring to U.S. Pat. No. 3,818,592, this knife forming the subject matter of this patent appears to be specially designed for peeling or exfoliating sticking pieces such as labels, seals, tapes and the like from paper sheet surfaces. One of the disadvantages of a knife of this type is that the sharp edges thereof make it necessary to provide a sheath within which the knife blade may be enclosed in the interest of safety. It is not adapted, for instance, to be deposited in a shirt pocket with its cutting edges exposed because of the danger of physical damage to clothing and the person wearing the clothing.

U.S. Pat. No. 4,248,660 describes and illustrates a specialized tool for removing labels that are adherent to a supporting surface and constitutes a specialized tool formed from two parts, namely, a blade portion and a handle portion.

Finally, U.S. Pat. No. 5,022,951 is a specialized label remover and applicator of such labels, and in this respect functions as a tweezer to grasp the label and direct Its deposit in a special location.

SUMMARY OF THE INVENTION

In terms of broad inclusion, the tape and tape "liner" removal tool of the invention comprises a generally elongated strip of metal, preferably spring steel, having in its completed form an overall length of approximately 3¼" to 3½" and a width of only ¾". One end of the strip is bent back upon itself and formed with a diverging lip to enable insertion of the tool into a shirt pocket and clipping of the tool to the shirt pocket material to prevent inadvertent loss of the tool. At its opposite end, the tool is provided with one or more sharpened edges, and in at least one aspect of the invention with an aperture that may be used to suspend the tool from a convenient nail at the workplace. On another aspect of the invention, the sharpened end portion of the tool is provided with lateral recesses that facilitate use of the tool for cutting tape or tape "liner" material.

BRIEF DESCRIPTION OF THE DRAWINGS

FIGS. 1 through 7 illustrate the invention in substantially actual size.

DESCRIPTION OF THE PREFERRED EMBODIMENTS

Figure 1:
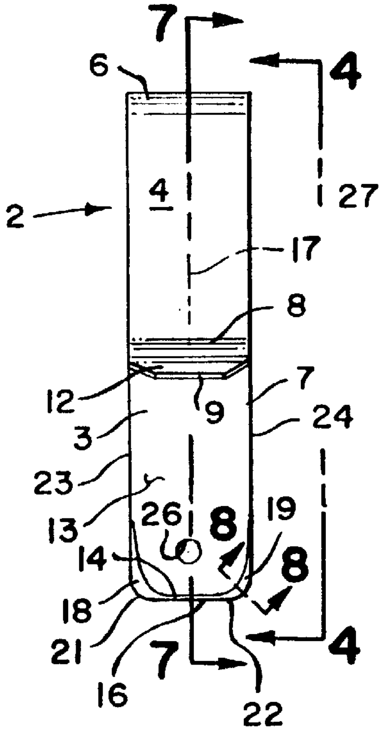
FIG. 1 is a front elevational view of a first embodiment of the tape and tape liner removal tool.
Figure 4:
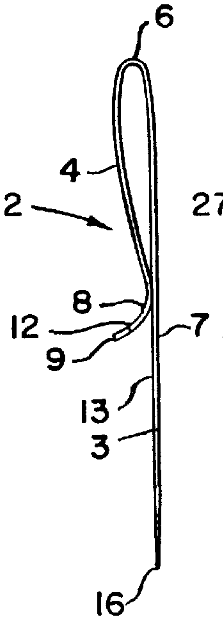
FIG. 4 is a side elevational view of the tape and tape liner removal tool of FIG. 1 taken in the direction of the arrows 4—4 in FIG. 1.
Figure 8:
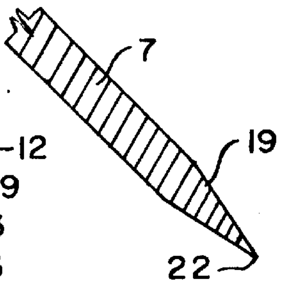
FIG. 8 is an enlarged fragmentary cross-sectional view taken in the planes indicated by the lines 8—8 in FIGS. 1, 2 and 3.

Referring to FIGS. 1, 4 and 8, the tape and tape liner removal tool of the invention illustrated therein is one embodiment of the tool designated generally by the numeral 2. As seen from the illustration, the tool is relatively simple, comprising an elongated metallic strip 3, preferably formed from spring steel, but also capable of being fabricated from stainless steel or other appropriate metals, and even other appropriate materials that are non-metallic, but capable of being sharpened in the mariner which will hereinafter appear.

At one end of the tool, an end portion 4 of the strip is bent over at bend 6 so that the end portion 4 converges toward the associated flat surface of main body portion 7 of the tool, and is further provided with a bend 8 adjacent the end edge 9 of the end portion so that the extreme end portion 12 of the metallic strip diverges from the surface of the main body of the strip commencing at the bend 8 which resiliently Impinges on the flat surface 13 of the strip at about midway between the bend 6 and the opposite end edge 14 of the strip. As illustrated in FIGS. 1, 4 and 8, the end edge 14 of the strip is ground, filed or whetted to provide a sharpened edge 16, in the nature of a chisel-edge, extending transversely on opposite sides of a median line 17.

At opposite corners, the whetted areas 18 and 19 of the opposite corner surfaces are expanded to provide generally arcuate sharpened edges 21 and 22 that converge into and become the lateral edges 23 and 24 of the body portion 7 of the tool. Referring again to FIGS. 1 and 4, it will be noted that there is provided centrally disposed along the median line 17 and adjacent the end edge 16 a circular aperture 26 that penetrates the thickness of the metal and provides a means by which the tool may be suspended from a nail, for instance, at the location where the tool is to be used by more than one person.

Figure 2:
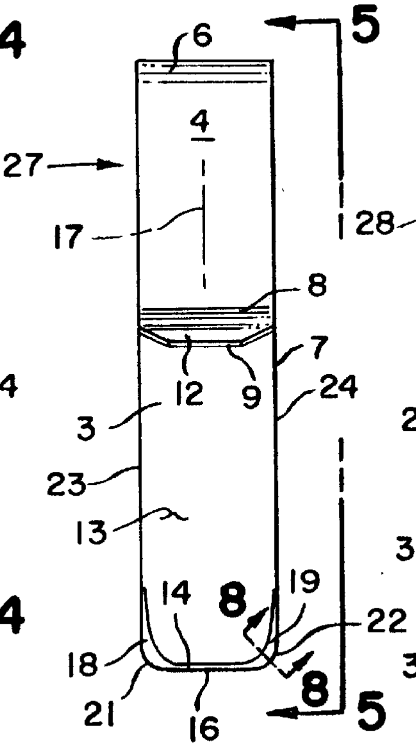
FIG. 2 is a front elevational view of a second embodiment of the tape and tape liner removal tool.
Figure 5:
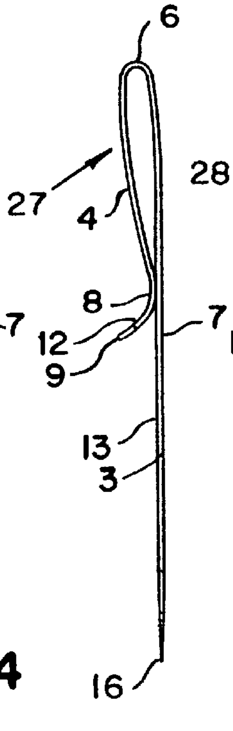
FIG. 5 is a side elevational view of the tape and tape liner removal tool of FIG. 2 taken in the direction of the arrows 5—5 in FIG. 2.
Figure 6:
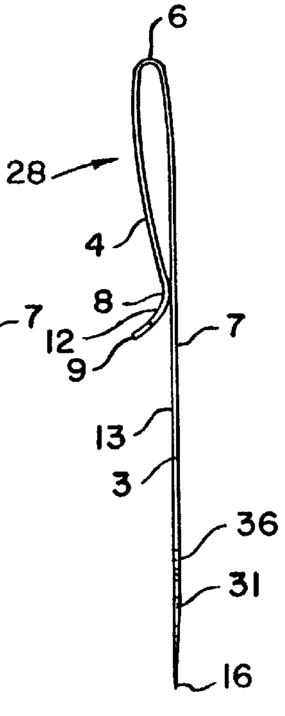
FIG. 6 is a side elevational view of the tape and tape liner removal tool of FIG. 3 taken in the direction of the arrows 6—6 in FIG. 3.
Figure 7:
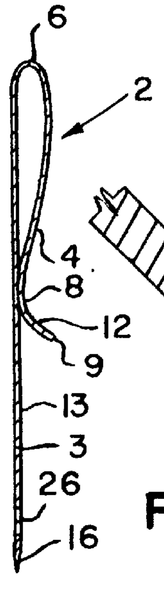
FIG. 7 is a vertical cross-sectional view taken in the plane indicated by the line 7—7 in FIG. 1.

The tool illustrated in FIGS. 2 and 5 is very similar to the tool illustrated in FIGS. 1 and 4. This embodiment of the invention is designated generally by the numeral 27. In the interest of brevity in this description, corresponding reference numbers are applied to corresponding elements of the tool, which elements perform the same functions attributed to the tool embodiment illustrated in FIGS. 1 and 4, and the explanation of which is included hereat by reference. As illustrated in the drawings, the two main differences in this embodiment (FIG. 2) when compared with the embodiment illustrated in FIGS. 1 and 4, is that the tool length has been increased, and the aperture 26 has been eliminated. Otherwise, the two embodiments are essentially the same.

Figure 3:
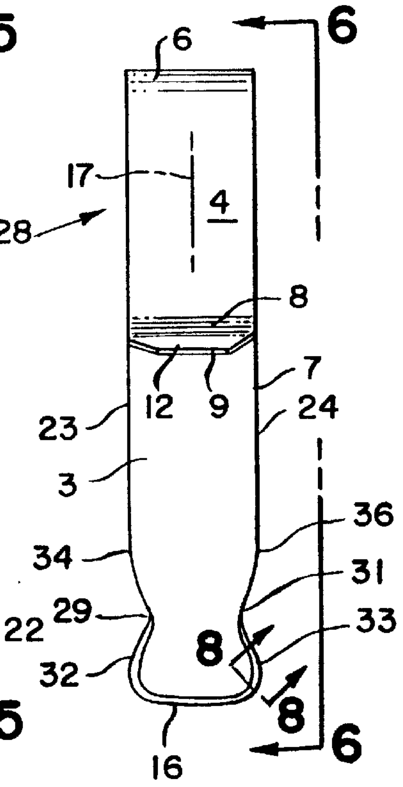
FIG. 3 is a front elevational view of a third embodiment of the tape and tape liner removal tool.

The third embodiment of the invention illustrated in FIG. 3 and designated generally by the numeral 28, is different from the first and second embodiments illustrated in FIGS. 1 and 2, respectively, in that the lateral edges 23 and 24 of the main body portion 7 adjacent the sharpened end edge 16 are provided with arcuate concave recesses 29 and 31, respectively. As illustrated, the sharpened corner surfaces 18 and 19 form a continuation of the sharpened end edge 16 and converge inwardly into the recesses 29 and 31 in sharpened edges 32 and 33 that terminate at the bottoms of the recesses. From the bottoms of the recesses the two edges of the body 7 diverge from one another and merge smoothly at 34 and 36 with the lateral edges 23 and 24, respectively, of the main body portion 7, It should also be noted that this third embodiment, like the second embodiment illustrated in FIG. 2, is devoid of the recess 26.

The recesses 29 and 31, with sharpened edges 32 and 33 extending thereinto, as shown, provide a sharpened protrusion in the nature of a hook along each lateral edge of the tool, enabling the sharpened end of the tool, with its projecting sharpened edges 32 and 33, to be used to cut strands of string or cord, and also to conveniently cut across the width of a roll or sheet of paper of the type used for newspapers or for other purposes, such as asphalt roofing and waterproof building paper.

Figure 9:
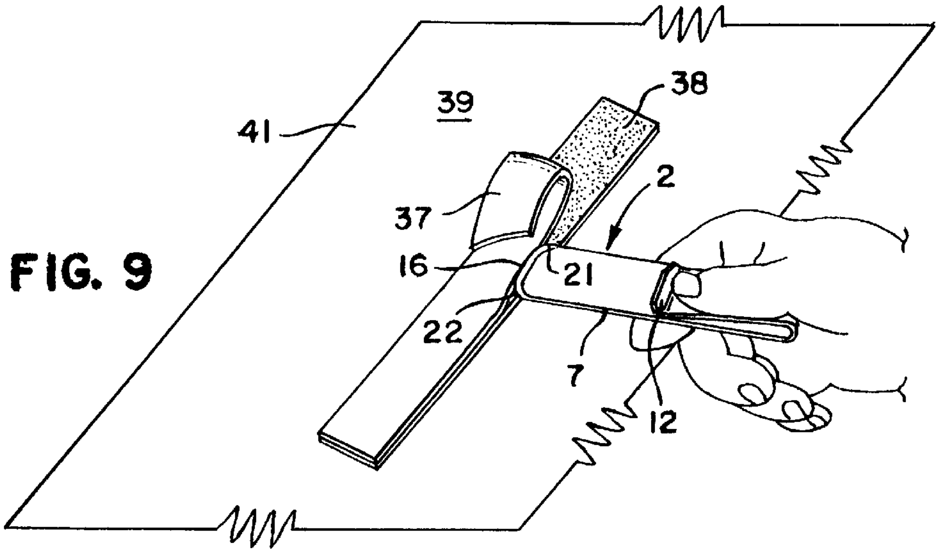
FIG. 9 is an environmental view in perspective, illustrating use of the tape and tape liner removal tool by a right-handed worker to remove the liner from a length of adhesive tape adhered to a piece of paper.
Figure 10:
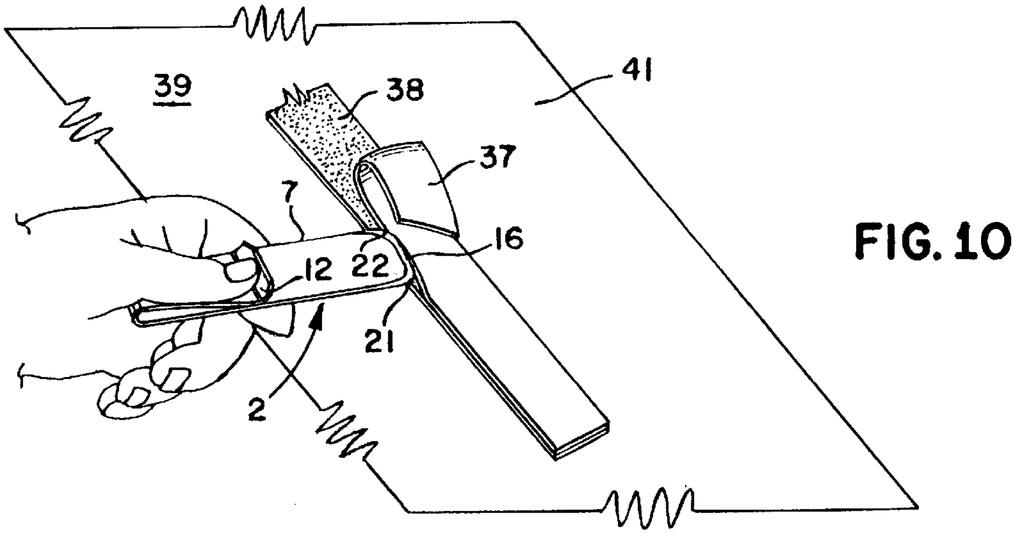
FIG. 10 is an environmental view in perspective, similar to FIG. 9, but illustrating the tape and tape liner removal tool being used by a left-handed individual to remove the liner from a length of adhesive tape adhered to a piece of paper.
Figure 11:
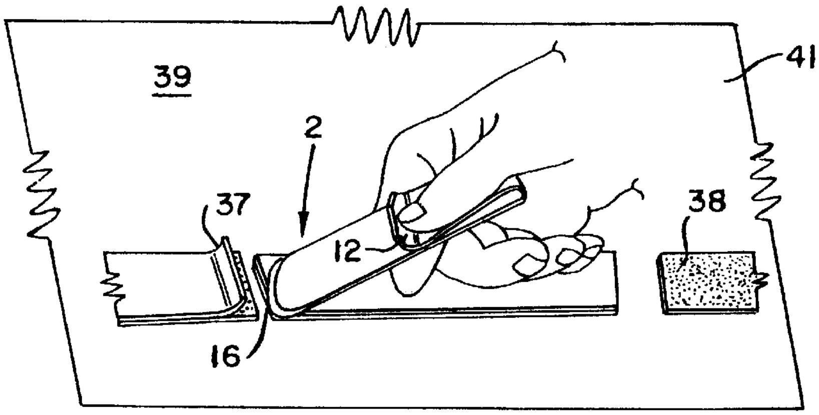
FIG. 11 is an environmental view in perspective illustrating use of the sharpened end of the tape and tape liner removal tool by a right-handed person to remove the liner from a length of adhesive tape adhered to a piece of paper.

Referring to the environmental views of FIGS. 9, 10 and 11, it will be seen that the tool 2 in FIG. 9 is shown being used to remove the strip 37 of protective “liner” paper from a strip of two-sided adhesive tape 38 adhered by one side to the surface 39 of a sheet of paper 41. It will of course be understood that having detached a length of the “liner” paper as shown,. The detached end may now be grasped by the fingers and removed entirely from the underlying layer of adhesive to which it is lightly and removably adhered.

The environmental view of FIG. 10 is similar to the view of FIG. 9 but illustrates the tool 2 being used by a left-handed individual as distinguished from a right-handed individual as in FIG. 9.

In FIG. 11, the tool 2 is shown being used to cut transvertsely through the strip of two sided adhesive tape and “liner” paper through use of the sharpened end 16 of the tool as distinguished from the sharpened corners and lateral edges of the tool as when used as in FIGS. 9 and 10. It Is also important to note that in all these environmental views, the individual’s thumb is shown pressed against and shielded by the diverging end portion 12 of the tool which, at the bend 8, presses resiliently against the surface 13 of the main body portion 7 as previously explained.

Having thus described the invention, what is believed to be new and novel and sought to be protected by letters patent of the United States is as follows.

We claim:

1. A multi-purpose hand tool, comprising:

a) an elongated unitary strip relatively narrow as compared to its length and including a main body portion having lateral edges defining the limits of two opposed flat surface portions and therewith defining said main body portion;

b) a sharpened edge on at least one end edge portion of said elongated unitary body; and c) a reentrant end portion remote from said at least one sharpened end edge portion of said elongated unitary body, said reentrant end portion of said elongated body being bent back to converge toward said main body portion and including a bend therein adjacent its end remote from said first mentioned bend that defines the integral union of said reentrant end portion and said main body portion.

2. The tool as described in claim 1, wherein said elongated unitary strip is formed from metal.

3. The tool as described in claim 1, wherein said elongated unitary strip is formed from spring steel.

4. The tool as described in claim 1, wherein said sharpened edge on one end of said elongated unitary body includes the end edge of said body and the adjacent side edges of said body.

5. The tool as described in claim 1, wherein said main body portion adjacent said sharpened edge is provided with arcuate concave recesses formed in the lateral side edges of said main body portion spaced from said sharpened edge.

6. The tool as described in claim 5, wherein end edge of said main body portion and the lateral side edges of said main body portion extending into said recesses are sharpened to provide continuous end and side edge portions that are sharpened.

7. The tool as described in claim 1, wherein said main body portion adjacent said sharpened edge is provided with a centrally positioned aperture.

* * * * *